United States Patent [19]

Bloom

[11] Patent Number: 5,839,904
[45] Date of Patent: Nov. 24, 1998

[54] PHLEBOTOMY TRAINING DEVICE

[76] Inventor: Ellen A. Bloom, 8475 Shadow Ct., Coral Springs, Fla. 33071

[21] Appl. No.: 947,735

[22] Filed: Oct. 9, 1997

[51] Int. Cl.[6] .................................................. G09B 23/28
[52] U.S. Cl. ........................................ 434/268; 434/272
[58] Field of Search ................................... 434/262, 267, 434/268, 272

[56] References Cited

U.S. PATENT DOCUMENTS

| | | | |
|---|---|---|---|
| 2,689,415 | 9/1954 | Haver . | |
| 2,794,897 | 3/1957 | Lade . | |
| 2,871,584 | 2/1959 | Poole | 434/268 |
| 2,995,832 | 8/1961 | Alderson | 434/268 |
| 3,722,108 | 3/1973 | Chase | 434/267 |
| 3,789,518 | 2/1974 | Chase . | |
| 4,182,054 | 1/1980 | Wise et al. . | |

*Primary Examiner*—Kien T. Nguyen

[57] ABSTRACT

A phlebotomy training device including a core member incorporating a network of channels wherein resilient tubing is placed to form artificial veins and arteries. The tubing communicates with a fluid reservoir disposed at a proximal end of the device for maintaining the tubing full of fluid. A membrane covers the device and presents a puncture resistant characteristics similar to that of skin. The device is adapted for attachment to a person's arm so that a student can practice venipuncture techniques on a live subject, including the proper positioning of an actual human arm, without the risks associated with puncturing living tissue.

14 Claims, 3 Drawing Sheets

PHLEBOTOMY TRAINING DEVICE

BACKGROUND OF THE INVENTION

1. Field of the Invention

The present invention relates to medical training devices, and more particularly to an apparatus, for attachment to a human arm, to artificially simulate arteries and veins of a limb for training medical personnel in venipuncture techniques, such as techniques used in sampling blood or connecting intravenous devices.

2. Description of the Background Art

The human circulation system consists of the heart and blood vessels, which together maintain a continuous flow of blood through the body. The heart pumps oxygen-rich blood from the lungs to all parts of the body through a network of tubes called arteries. Blood returns to the heart via small vessels called venules, which lead in turn into larger vessels called veins.

Medical personnel are routinely required to pierce the veins or arteries (hereinafter venipuncture) to obtain a blood sample, connect intravenous devices, or to inject medicine or fluids. Since the human anatomy includes a small number of veins that are easily accessible to medical personnel, it is important that proper techniques are employed during venipuncture procedures to maintain the condition and availability of suitable veins and arteries.

Venipuncture techniques are well known in the art of phlebotomy, however, practice is required for an individual to develop and perfect proper technique. Generally speaking, the following procedures are recognized in the performance of venipuncture. First, the medical professional must properly position the patient and the patient's limb, typically an arm, for the procedure. Next, the medical professional must select the proper equipment for the particular procedure. While there are a number of venipuncture devices known in the art, the present invention is most concerned with evacuated blood systems, manual syringe devices, and devices incorporating a needle having a shaft and terminating in a beveled point. Next, the medical professional selects the proper site, typically on the patient's arm, for venipuncture. Selection of the proper site involves use of an index finger to verify the location and direction of a particular vein. The medical professional must then perform the venipuncture procedure which typically requires: positioning the needle in a direct line with the selected vein, below the venipuncture site and at an angle of approximately 15° relative to the patient's arm; turning the needle so that the bevel is disposed upward; puncturing the skin and vein in a single smooth motion; and maintaining the needle steady for the remainder of the procedure. On the other hand, an arterial puncture is preferably achieved with the needle disposed at a 90° with respect to the punctured artery.

Since developing venipuncture skills requires practice, the background art includes several devices intended to artificially simulate arteries and veins of a human limb for enabling a medical professional to repeatedly practice and develop proper venipuncture skills. U.S. Pat. No. 2,689,415, issued to Haver, discloses an anatomical instruction model for use in instructing students in venipuncture techniques. U.S. Pat. No. 2,704,897, issued to Lade, discloses a device for teaching venipuncture. U.S. Pat. No. 3,789,518, issued to Chase, discloses a simulated human limb. U.S. Pat. No. 4,182,054, issued to Wise et al., discloses an artificial arm for simulating arteries of a limp for training in venipuncture techniques.

The devices of the background art are all complex and expensive and consequently are not found in large numbers in most medical training facilities. Furthermore, most of the devices of the background art must be supported on a table and thus fail to simulate the difficulties experienced with positioning of the limb of an actual live patient. In addition, the devices of the background art fail to disclose a venipuncture training device for use as a training device for both venipuncture techniques relating to arteries, as well as veins. The background art also fails to disclose a suitable venipuncture training device that can be attached to the arm of a person to facilitate venipuncture training.

SUMMARY OF THE INVENTION

A training device for attachment to a human arm, for training medical personnel in venipuncture techniques. The training device can be secured to the arm of a person so that a student can practice venipuncture techniques, including the proper positioning of an actual human arm. The device further includes anatomically accurate features including fluid filled simulated veins and arteries which provide an anatomically accurate representation of blood vessels. The device further incorporates materials which simulate the resilience and puncture resistance of actual human skin, veins, and arteries.

The device is sized for attachment to a human forearm and includes a puncture resistant protective base, end wall, and side flaps for preventing the accidental piercing of the wearer's arm during use. Unlike the devices disclosed in the background art, the present device is secured to the arm of a live human practice subject, so that a student gains experience in the proper positioning of the patient and the patient's arm for venipuncture procedures. The device further includes a resilient core for simulating the puncture resistance of muscle and tissue found in the forearm. The core material defines a network of channels wherein resilient tubing is placed to form artificial veins and arteries. The tubing is selected to accurately simulate the size, resiliency, and piercing characteristics of actual veins and arteries (hereinafter "venus tubing" and "arterial tubing") for providing a highly realistic training device. The venus tubing and the arterial tubing each define independent fluid circuits and each fluid circuit includes a tubing connection projecting from one end of the device to facilitate the connection of a compact pressurized fluid source, for filling the circuit with a liquid and/or maintaining and manual manipulation of hydrostatic pressure for simulating blood pressure. The invention further includes an artificial skin, preferably formed of a latex material, substantially covering the device such that the underlying tubing may remain slightly visible and palpable.

Once the device is strapped on to a user's forearm and filled with fluid, a student is able to practice and develop proper venipuncture procedures without any of the risks associated with practicing the procedures on a person's actual veins and arteries. Simulated venipuncture using the present invention includes teaching the student how to manipulate and otherwise properly position a person's arm. In addition, the student is provided with a highly effective training device that allows for repeated practice without risk of injury or pain. The selection of materials also provides a realistic feedback sensation of puncturing the skin as well as the vein or artery, which feedback provides an important learning tool in developing and understanding proper venipuncture procedure. Once a vein has been successfully punctured by a hypodermic needle, fluid may be drawn up through the needle thereby simulating the taking of blood.

Accordingly, it is an object of the present invention to provide an improved phlebotomy training device.

Yet another object of the present invention is to provide a phlebotomy training device for use while secured to a person's arm to realistically simulate positioning of an arm during venipuncture procedures.

Still another object of the present invention is to provide a phlebotomy training device that includes independent fluid circuits, each of which simulates the location, feel and piercing characteristics of either a vein or an artery.

In accordance with these and other objects which will become apparent hereinafter, the instant invention will now be described with particular reference to the accompanying drawings.

DESCRIPTION OF THE PREFERRED EMBODIMENTS

Figure 1:
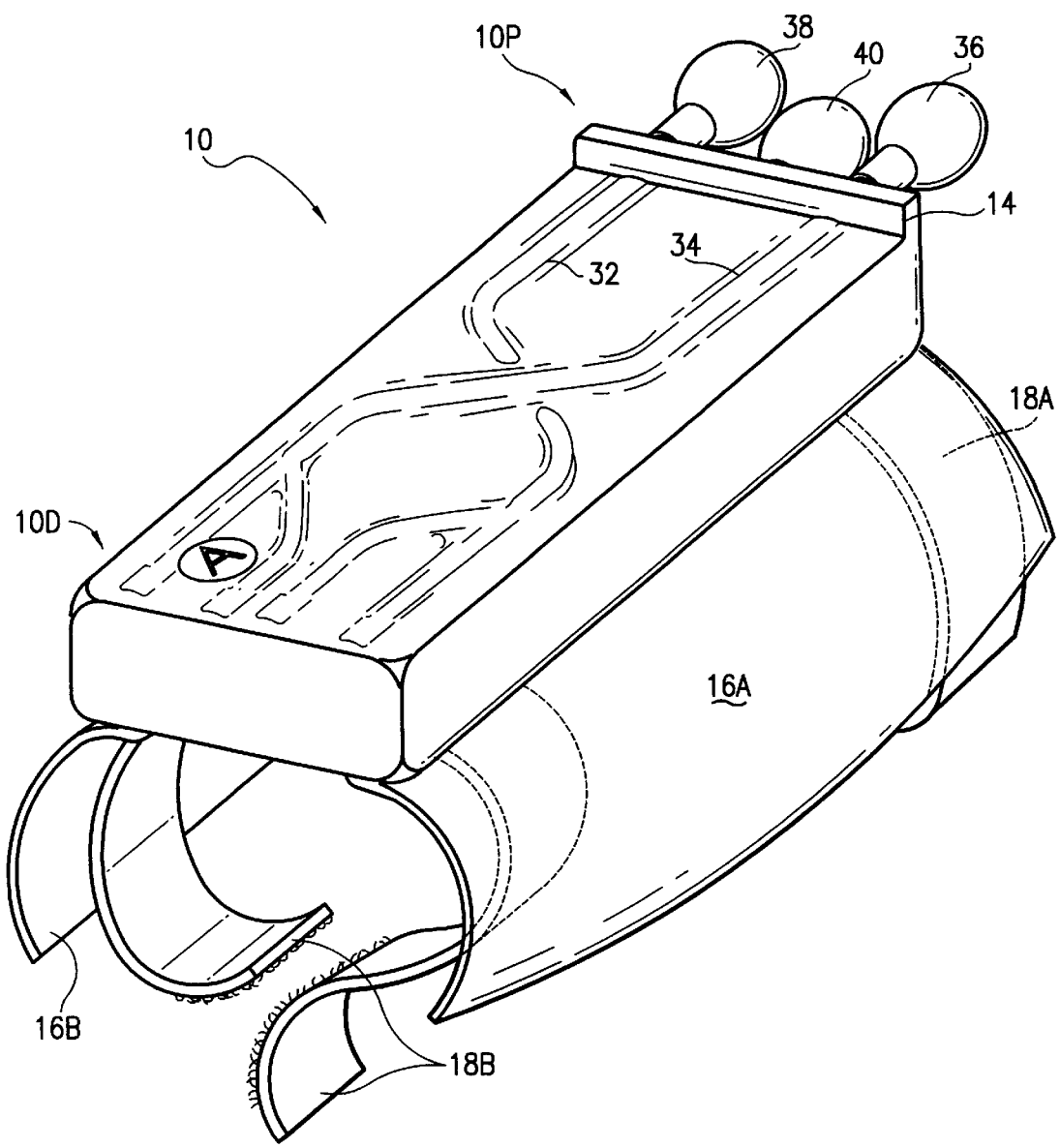
FIG. 1 is a perspective view of a phlebotomy training device of the present invention.
Figure 2:
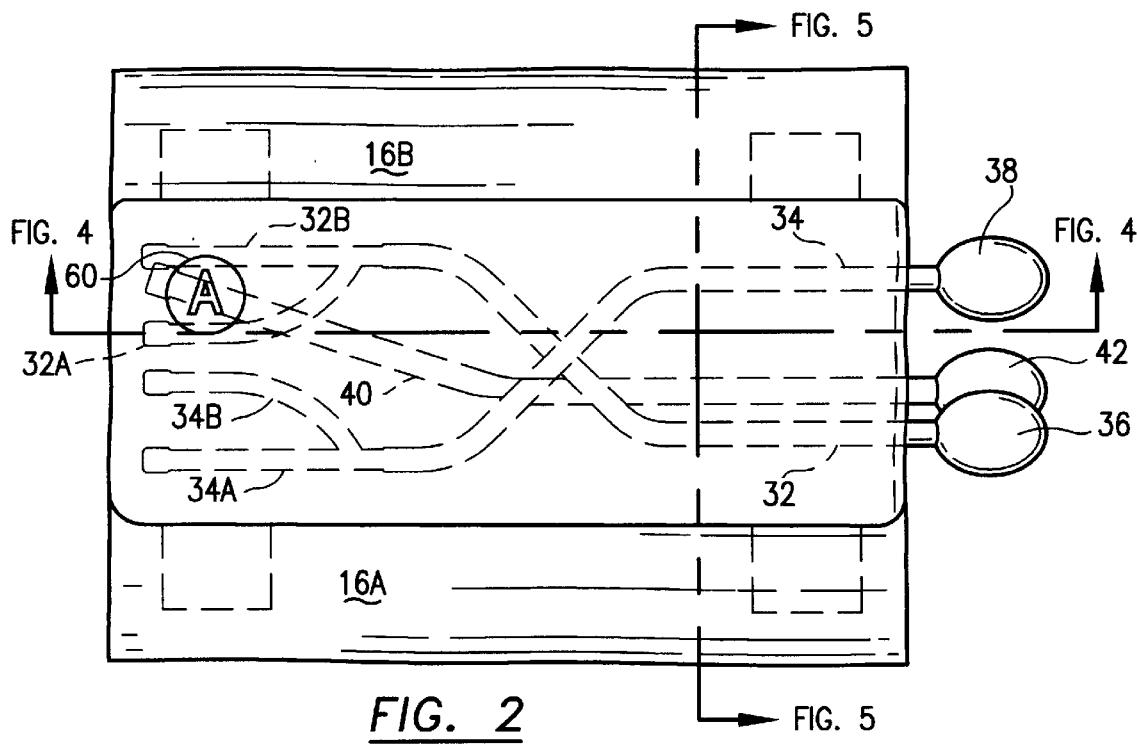
FIG. 2 is a top plan view of a phlebotomy training device of the present invention.
Figure 3:
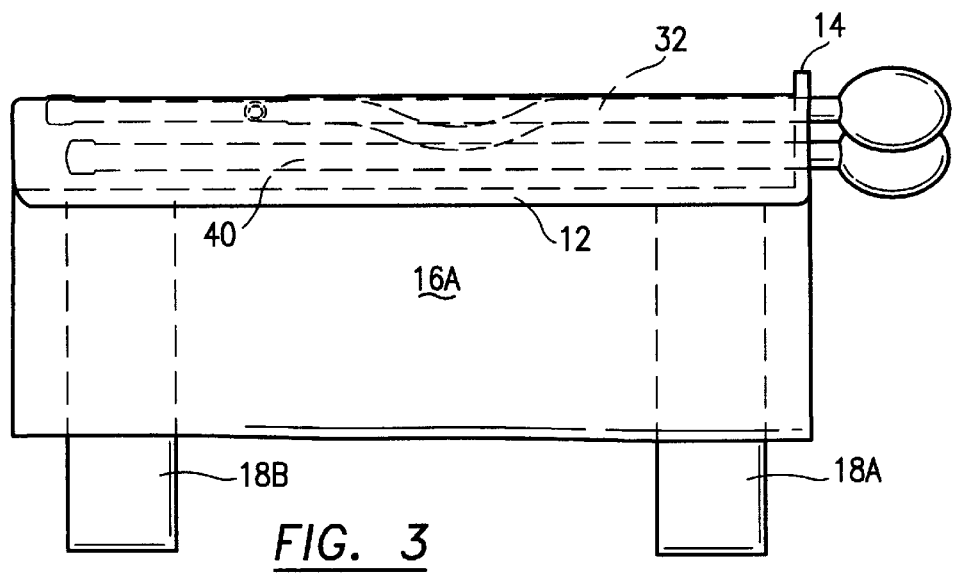
FIG. 3 is a side elevational view of a phlebotomy training device of the present invention.

FIGS. 1–5 depict a phlebotomy training device according to the present invention, generally referenced as 10. Phlebotomy training device 10 includes a proximal end 10P and a distal end 10D. In the preferred embodiment, the device further includes a puncture resistant base 12, proximal wall 14, and flaps 16A and 16B, and a pair of straps 18A and 18B for securing the device to a person's forearm. The device further includes a core element 20, a venus tubing network 32 and 34, an arterial tubing network 40, and a skin-like membrane cover 50.

Figure 4:
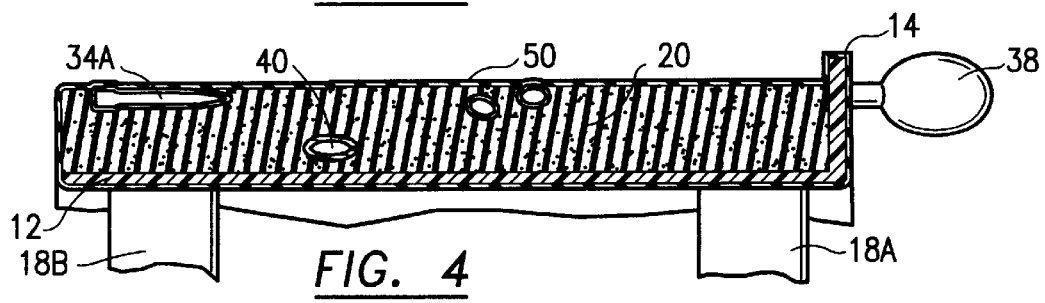
FIG. 4 is a side elevational view in section along line 4—4 in FIG. 2.
Figure 5:
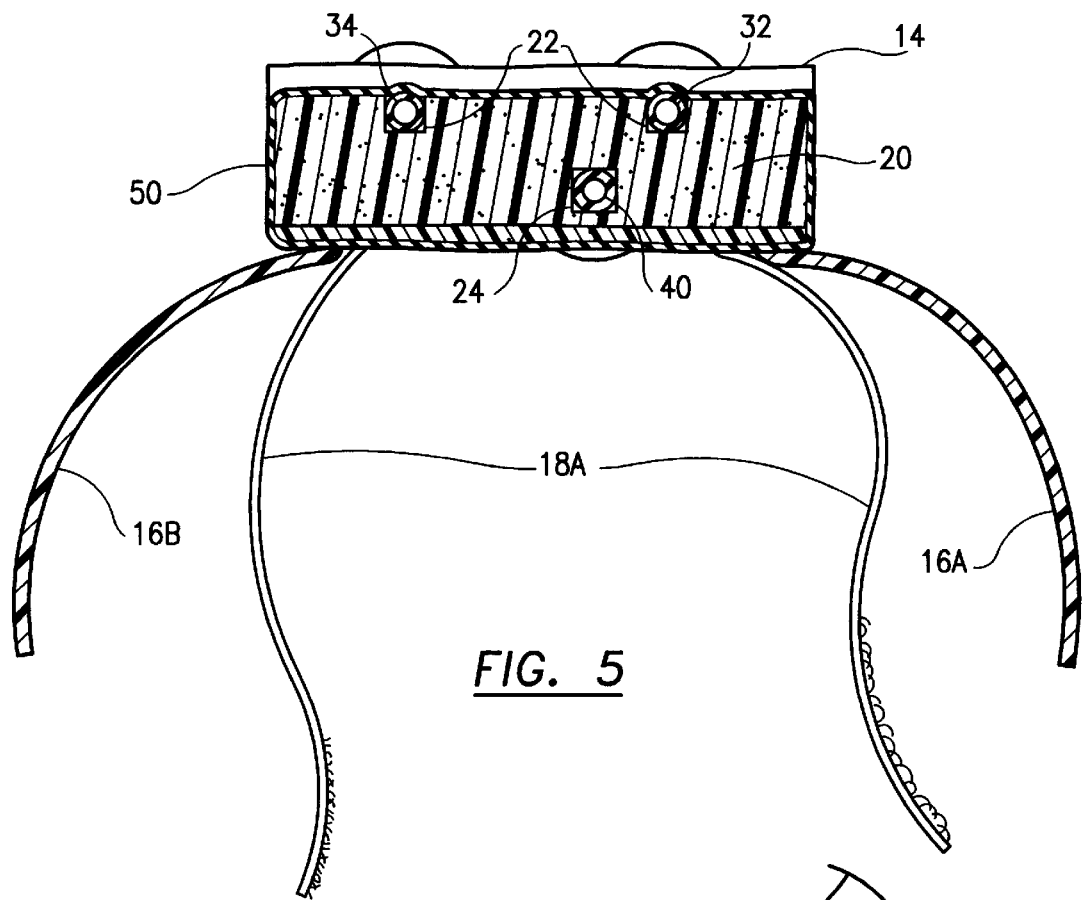
FIG. 5 is a transverse sectional view along line 5—5 in FIG. 2.

As best depicted in FIGS. 4 and 5, base 12 and proximal wall 14 may be formed from any suitable puncture resistant material, such as plastic. Base 12 functions as a puncture resistant sub-structure and provides semi-rigid, yet flexible support, while preventing the accidental puncturing of the device's wearer during use. Proximal wall 14 prevents needles from exiting the proximal end of the device and thus further prevents accidental puncturing of the device's wearer during use. Likewise, flaps 16A and 16B comprise laterally projecting, puncture resistant flaps to protect the wearer's limb from accidental puncture during use. In the preferred embodiment, flaps 16, are formed from any suitable flexible puncture resistant material. The device 10 is removably secured to a limb, such as an arm, of a wearer by straps 18A and 18B. Straps 18 may be connected to base 12 and formed of any suitable material and preferably include hook and loop fastening material thereon to facilitate adjustment and securing of the device to a wearer's arm.

Core element 20 comprises a resilient, foam or sponge-like material which simulates the puncture resistance of muscle and tissue found in the forearm. Core element 20 may be fabricated from any suitable material, having puncture resistant characteristics similar to the puncture resistant characteristics of the muscle and/or tissue found in a human forearm, such material may comprise expanded PVC, plastics, rubber, or cellulose. Core element 20 is preferably adhesively connected to base 12, but may be secured in any suitable manner. Core element 20 defines a myriad of surface channels 22 and an internal passage 24. Channels 22 and internal passage 24 are sized for receiving fluid tubing.

Channels 22 receive venus tubing 32 and 34 forming two independent fluid circuits 32 and 34, and passage 24 receives arterial tubing 40 forming an arterial fluid circuit. Venus tubing 32 and 34 and arterial tubing 40 are selected to accurately simulate the size, resiliency, and piercing characteristics of actual veins and arteries for providing a highly realistic training device. Since the arteries of the human body have thicker walls than veins, an evolutionary result of arteries being exposed to greater pressure than the pressure encountered by veins, the arterial tubing used in the present invention may have thicker walls, and thus different puncture resistance, than the venus tubing.

In the preferred embodiment the venus tubing is only partially received within channels 22 such that a portion of the venus tubing projects above the top surface of the core element 20, thereby providing an anatomically realistic vein structure which is suitable for being palpably detected by a practicing student. In addition, each circuit of venus tubing branches into first and second proximal legs, 32A–32B and 34A–34B respectively, of a reduced diameter, for anatomically simulating a branched vein structure. Each leg 32A, 32B, 34A, and 34B, should each have a diameter that is less than the diameter of primary tubing 32 and 34, while maintaining a diameter that is large enough to receive a butterfly winged infusion set having a size of approximately 23 to 25 gage.

Furthermore, arterial tubing 40 is internally positioned within core element 20, thereby providing an anatomically realistic arterial structure. Accordingly, the venus tubing and the arterial tubing provide a network of blood vessels that simulate the size and location of veins and arteries of the cephalic, basilic and median cubital regions of a human arm. It is further desirable that all of the tubing used be capable of withstanding repeated punctures from a conventional hypodermic needle (e.g. 21–23 gage) while maintaining water tight integrity.

Figure 6:
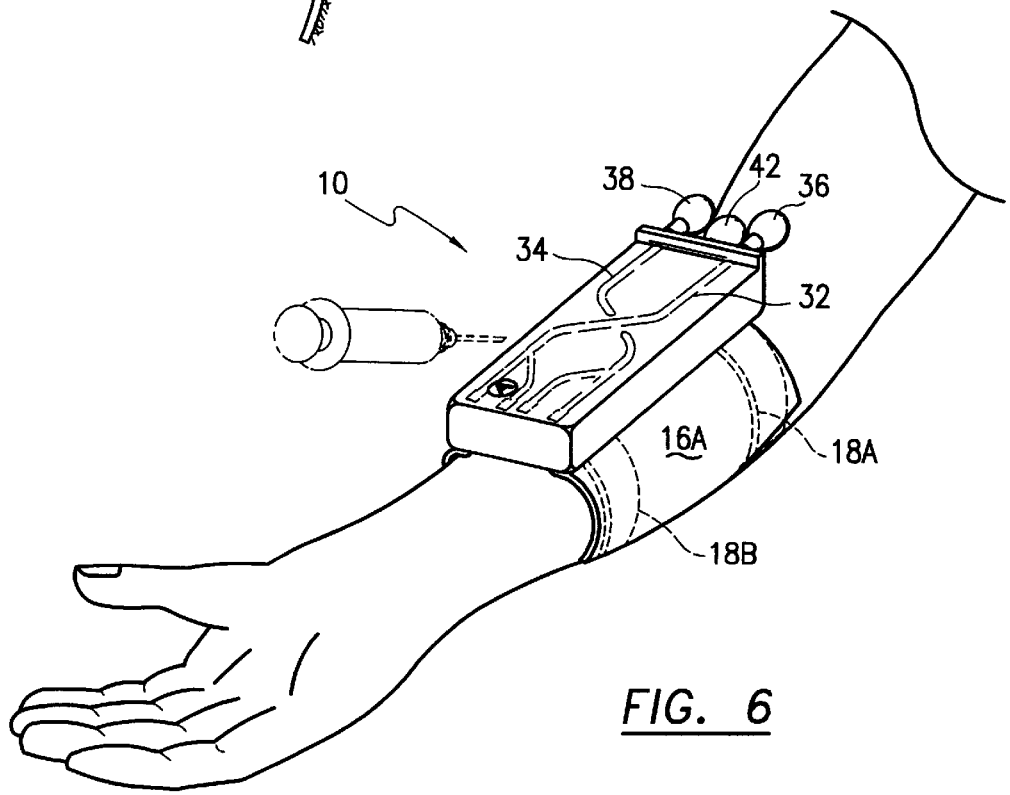
FIG. 6 is a top perspective view of the phlebotomy training device of the present invention attached to a wearer's arm.

Each fluid circuit communicates with a fluid reservoir, 36, 38 and 42 respectively, which project from the proximal end 11 of device 10 for filling each circuit with a liquid and providing for manual manipulation of hydrostatic pressure for simulating blood pressure. In the preferred embodiment, fluid reservoirs 36, 38, and 42, each comprise a resilient, fillable bulb. In an alternate embodiment, a single fluid reservoir, in fluid communication with each fluid circuit, may be used in lieu of multiple fluid reservoirs. In yet another alternate embodiment, a first reservoir may be fluidly connected to each venus tubing circuit, while a second reservoir may be fluidly connected to each arterial tubing circuit. Reservoirs 36, 38, and 42 are preferably fabricated from a material that will not leak after being punctured (e.g. self-sealing) to facilitate filling of each circuit, using a hypodermic needle and fluid filled syringe, with a fluid such as colored water. In an alternate embodiment, reservoirs 36, 38, and 42 may include a fill port for receiving a hypodermic needle of a fluid filled syringe for filling each circuit with fluid, such as colored water. Furthermore, reservoirs 36, 38, and 40, are preferably resilient such that the reservoirs may be manually and rhythmically squeezed to simulate fluctuations in blood pressure and facilitate palpable detection of the veins. The location of reservoirs 36, 38, and 40, at the proximal end of the device functions to maintain the tubing circuits full of fluid since, when attached to a properly positioned arm on a wearer, the reservoirs will be elevated with respect to the tubing network (e.g. see FIG. 6). It is contemplated that the venus reservoir(s) and tubing will be filled with a blue fluid, while the arterial reservoir(s) and tubing will be filled with a red fluid.

The device further includes a skin-like membrane cover 50 which has piercing characteristics similar that of human skin. In the preferred embodiment cover 50 is formed from suitably thin latex material and substantially encloses core element 20, venus tubing network 32 and 34, and arterial tubing network 40. In the preferred embodiment, membrane 50 includes indicia, referenced as 60, for identifying the proper puncture location for piercing the underlying simulated artery 40.

Once the fluid filled device is strapped on to a user's forearm, a student is able to practice and develop proper venipuncture procedures without any of the risks associated with practicing the procedures on a person's actual veins and arteries. Simulated venipuncture using the present invention includes teaching the student how to manipulate and otherwise properly position a person's arm. In addition, the student is provided with a highly effective training device that allows for repeated practice without risk of injury or pain. The selection of materials also provides a realistic feedback sensation of puncturing the skin as well as the vein or artery, which feedback provides an important learning tool in developing and understanding proper venipuncture procedure. Once a vein has been successfully punctured by a needle, fluid may be drawn up through the needle thereby simulating the taking of blood.

The device may also be attached over the wearer's wrist and partially covering the top of the wearer's hand for use in practicing hand stick techniques that are commonly used to supply intravenous fluids. In this configuration, techniques may be practiced on vein branches 32A, 32B, 34A and 34B, which provide an anatomically accurate representation of veins existing on the top (i.e. side opposite of the palm) of the human hand.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A phlebotomy training device for use in teaching venipuncture techniques, said device comprising:
    a core member having a proximal end, a distal end, and top and bottom surfaces, said top surface defining at least one channel therein;
    vein simulating resilient tubing received within said channel;
    a fillable fluid reservoir in fluid communication with said tubing;
    skin simulating membrane cover disposed over said core member top surface; and
    means connected to said core member, for attaching said core member to a human arm.

2. A phlebotomy training device according to claim 1, further including a puncture resistant base connected to said bottom surface.

3. A phlebotomy training device according to claim 1, further including a puncture resistant wall vertically disposed proximate said core member proximal end.

4. A phlebotomy training device according to claim 1, further including puncture resistant flaps for preventing the accidental piercing of the wearer's skin.

5. A phlebotomy training device according to claim 1, wherein vein simulating resilient tubing includes at least one branch forming first and second legs.

6. A phlebotomy training device according to claim 1, wherein said fluid reservoir is disposed at said proximal end.

7. A phlebotomy training device for attachment to a person's arm for use in teaching venipuncture techniques, said device comprising:
    a core member having a proximal end, a distal end, and top and bottom surfaces, said top surface defining at least one channel therein, said core member further defining an internal passage originating at said proximal end;
    vein simulating resilient tubing received within said channel and artery simulating resilient tubing received within said core passage, said tubing being self-sealing after puncture by a needle;
    said vein simulating tubing and said artery simulating tubing each communicating with a fillable fluid reservoir disposed substantially adjacent to said proximal end;
    skin simulating membrane cover disposed over said core member top surface;
    means for attaching said device to a human arm.

8. A phlebotomy training device according to claim 7, further including puncture resistant flaps for preventing the accidental piercing of the wearer's skin.

9. A phlebotomy training device according to claim 7, further including a puncture resistant base connected to said bottom surface.

10. A phlebotomy training device according to claim 7, further including a puncture resistant wall vertically disposed proximate said core member proximal end, said wall having a portion thereof extending vertically above said top surface.

11. A phlebotomy training device for attachment to a person's arm for use in teaching venipuncture techniques, said device comprising:
    a resilient core member having a proximal end, a distal end, top and bottom surfaces, and opposing sides, said top surface defining first and second channels originating at said proximal end, said core member further defining an internal passage originating at said proximal end;
    vein simulating resilient tubing received within said first and second channels and artery simulating resilient tubing received within said core internal passage, said vein simulating tubing forming first and second closed fluid circuits, and said artery simulating tubing forming a third closed fluid circuit, said tubing capable of self-sealing after puncture by a needle;
    said vein simulating tubing and said artery simulating tubing each communicating with at least one fillable fluid reservoir disposed substantially adjacent to said proximal end;
    skin simulating membrane disposed over said core member top surface;
    a puncture resistant base disposed along said core member bottom surface;
    a pair of puncture resistant lateral flaps projecting from said core member opposing sides; and
    means for attaching said device to a human arm.

12. A phlebotomy training device according to claim 11, wherein said at least one fillable fluid reservoir comprises a resilient bulb member.

13. A phlebotomy training device according to claim 11, further including a puncture resistant wall vertically disposed proximate said core member proximal end.

14. A phlebotomy training device for use in teaching venipuncture techniques, said device comprising:

a core member having a proximal end, a distal end, and top and bottom surfaces, said top surface defining at least one channel therein;

vein simulating resilient tubing received within said channel;

said tubing having an end portion projecting from said proximal end, said end portion including a fill port, said fill port connectable to a fluid filled syringe for providing a supply of fluid to said tubing;

skin simulating membrane cover disposed over said core member top surface; and means connected to said core member for attaching said core member to a human arm.

* * * * *